United States Patent [19]

O'Malley

[11] 4,093,760

[45] June 6, 1978

[54] SKID PIPE INSULATION FOR STEEL MILL REHEATING FURNACES

[75] Inventor: Martin Bernard O'Malley, Pittsburgh, Pa.

[73] Assignee: Johns-Manville Corporation, Denver, Colo.

[21] Appl. No.: 690,220

[22] Filed: May 26, 1976

[51] Int. Cl.[2] .............................................. B29C 17/04

[52] U.S. Cl. ...................................... 428/36; 138/178; 156/215; 432/234

[58] Field of Search .................... 156/62.2, 62.4, 62.6, 156/215, 297, 309, 325; 432/234; 122/164; 138/140, 141, 149, 178; 428/36; 427/204, 206

[56] References Cited

U.S. PATENT DOCUMENTS

| | | | |
|---|---|---|---|
| 1,959,078 | 5/1934 | Eddleman | 427/204 |
| 3,000,433 | 9/1961 | Kemper | 156/215 |
| 3,329,414 | 7/1967 | Greaney | 432/234 |
| 3,449,137 | 6/1969 | Ekdahl | 106/50 |
| 3,642,261 | 2/1972 | Laws | 432/234 |
| 3,706,448 | 12/1972 | Salter et al. | 432/234 |
| 3,848,034 | 11/1974 | Schaefer | 264/32 |

FOREIGN PATENT DOCUMENTS

| | | | |
|---|---|---|---|
| 1,247,481 | 9/1971 | United Kingdom | 432/234 |

*Primary Examiner*—William A. Powell
*Attorney, Agent, or Firm*—Robert M. Krone; Joseph J. Kelly; James W. McClain

[57] ABSTRACT

A method is described for the thermal insulation of steel mill reheat furnace skid pipes, which comprises adhering to the pipes an unbonded, unreinforced batt of refractory fiber, and, preferably, thereafter applying a layer of refractory cement to the top of the adhered batt. The insulation structure formed by this method is also described.

13 Claims, 3 Drawing Figures

SKID PIPE INSULATION FOR STEEL MILL REHEATING FURNACES

BACKGROUND OF THE INVENTION

The invention herein relates to thermal insulation for steel mill reheating furnace skid pipes.

It is common practice in steel mills to reheat slabs and billets for hot working in different types of reheating furnaces. One type in common use is the "pusher type" reheating furnace in which slabs or billets are pushed through several heating zones within the furnace to bring them to the desired temperature (which is usually in excess of about 2000° F (1100° C)). The slabs or billets slide through the furnace on hollow pipes with rail like projections ("skid rails") on the top thereof. Cooling water is continuously circulated through the hollow interior of the skid pipes. Typical "pusher type" reheating furnaces and their operation are described in *The Making, Shaping and Treating of Steel,* (McGannon, ed.: 9th edn., 1971), especially chapters 22 and 24.

Since the furnace is commonly at a temperature of about 2200° F (1200° C) and the cooling water in the skid pipes is at about 60° F (15° C), a substantial amount of heat (on the order of about 75,000 BTU/$ft^2$/hr or 240,000 joules/$m^2$/hr) is lost through the skid pipe to the cooling water. In order to prevent this heat loss, it is desirable to thermally insulate the skid pipes. Such insulation has been readily achieved for the water cooled uprights and cross-overs which support the skid pipes in the furnaces. The skid pipes, however, have proved to present a unique problem for thermal insulation for several reasons:

1. The high temperature thermal environment of the furnace is too severe for many common insulating materials.

2. Since the slabs slide over the skid rail portion of the skid pipes, insulation cannot be wrapped entirely around the skid pipes as it can the uprights and cross overs.

3. Since the skid rails are only approximately 1 inch (2.5 cm) high, clearance required for the slabs and billets limits insulation thickness to not more than that amount. Consequently, a suitable insulation must have a high thermal efficiency per unit thickness.

4. Scale falling from the passing billets and slabs can be highly damaging to the insulation.

5. It is sometimes necessary to cool down a reheat furnace rapidly, and this is conventionally done by spraying water throughout the furnace. The thermal shock thus imparted to the insulation is destructive to the more rigid types of insulation.

6. Finally, and most importantly, a skid pipe insulation is subjected to an extreme degree of vibration. Slabs are often 6 inches (15 cm) thick, 7 feet (2.1 m) wide, and 30 feet (9 m) long; billets may be 1 foot (30 cm) square in cross-section and up to 30 feet (9 m) in length; and both may weigh on the order of 5 to 7 tons (4.5 to 6.5 metric tons). Sliding a continuous row of such massive objects along the tops of the skid rails causes severe vibration of the entire skid pipe structure, which in turn rapidly destroys the integrity of most insulations.

In the past attempts have been made to overcome these adverse factors (particularly the thermal and vibrational problems) by making skid pipe insulations of massive rigid refractory cement materials containing internal metal reinforcements or anchors. Typical is the structure shown in U.S. Pat. No. 3,848,034, where a refractory cement is anchored to studs welded to the outside of the skid pipe. The massiveness of such materials have, of course, made them very difficult to apply, for they have required substantial supports. Also, workmen have only been able to install very small segments at any one time because of the great weight to be handled. The rigidity of the finished cements have also made them highly susceptible to damage by vibration and thermal shock.

In the mid-1960's a skid pipe insulation incorporating refractory fiber was introduced by Johns-Manville Corporation under the trademark "FIBERCHROME Skid and Support Pipe Insulation". This material is a vacuum formed cylindrical sleeve comprised of a binder impregnated refractory fiber mass, reinforced for skid pipe service with an internal web of stainless steel mesh similar to that used in chainlink fencing. In a typical installation the steel mesh is welded to the skid pipe and at least a portion of the outer surface of the sleeve is covered with refractory cement.

BRIEF SUMMARY OF THE INVENTION

The invention herein resides in the surprising discovery that a skid pipe can be effectively thermally insulated by applying thereto at least one unbonded, unreinforced batt of fibrous thermal insulation comprising refractory fiber, the batt being simply adhered to the outer surface of the skid pipe and being of a thickness not greater than the height of the skid rail projection such that no portion of the fibrous material extends above the top level of the skid rail projection. Use of refractory fiber insulation of this type represents a complete and total departure from the thermal insulation techniques of the prior art, for instead of using ever-more massive insulations which are heavily reinforced and elaborately anchored (such as those illustrated in the aforesaid U.S. Pat. No. 3,848,034), or using fiber only in a highly impregnated, preformed, reinforced embodiment, it has now been surprisingly discovered that a highly efficient and readily handleable insulation, which easily withstands the adverse thermal and vibrational conditions, is obtained by using a light, fluffy "flimsy" material without internal bonding or reinforcement.

In a preferred embodiment the insulation also includes a layer of refractory cement at the top to minimize mill scale damage.

DETAILED DESCRIPTION AND PREFERRED EMBODIMENT

Figure 1:
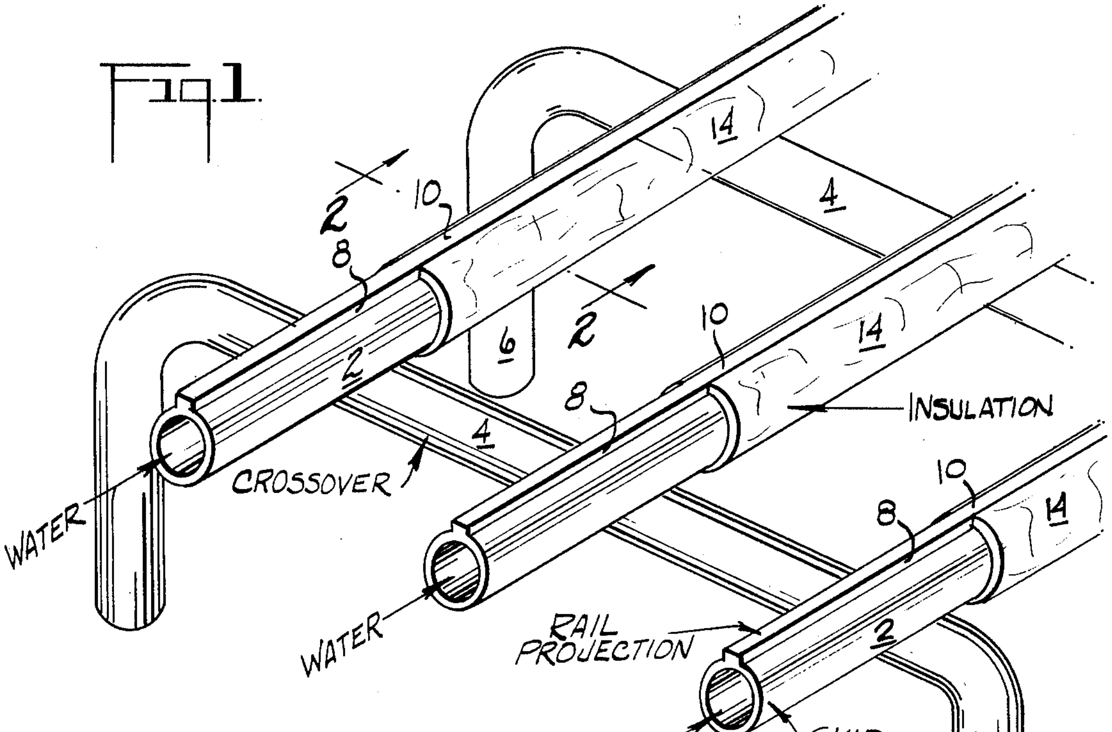
FIG. 1 is a perspective view illustrating generally a portion of a typical furnace structure, including the skid pipes and supporting uprights and cross-overs, and showing a portion of Applicant's insulation in place.
Figure 1:

The major element of the present invention is the discovery that, quite unexpectedly, many of the problems of insulating "pusher type" reheat furnace skid pipes can be substantially reduced by insulating the rail with at least one batt of unbonded, unreinforced refractory fiber thermal insulation which is directly adhered to the outer surface of the skid pipe with a suitable adhesive. The refractory fiber readily withstands temperatures in excess of 2000° F (1100° C) and is virtually unaffected by vibration because of its resilient nature. It is similarly virtually unaffected by thermal shock caused by rapid cooling of a furnace. In the thicknesses described below, it has also been found to offer a measure of resistance to the effects of the mill scale falling from the passing slabs and billets. Because of its light weight it is also quite easy to apply and can be applied in large segments, thus minimizing the amount of labor and time required to insulate furnace skid pipes.

The nature of the present invention will be most readily understood by reference to the drawings. In a typical installation skid pipes 2 are supported by crossovers 4 which in turn are themselves supported by uprights 6. The uprights and crossovers are normally hollow and constitute one cooling water circulation system. There is normally no direct connection between the crossover/upright cooling system and that of the skid pipes. There are a number of conventional methods of thermally insulating the crossovers/uprights to prevent heat loss, including unreinforced embodiments of the aforesaid Johns-Manville "FIBERCHROME Skid and Support Pipe Insulation". Because of the fundamentally more difficult problems associated with insulating skid pipes, however, those insulations which are quite satisfactory for crossovers and uprights are not normally usable for insulating skid pipes.

The invention herein, therefore, relates to insulating of the skid pipes 2. A typical skid pipe 2 has the shape shown best in FIG. 2. The skid pipe is an elongated hollow pipe having at the top thereof a projection or skid rail 8 which has a top bearing surface 10 along which the billets and slabs slide. The center of the skid pipe 2 is hollow and is filled with circulating water 12 to cool the skid pipe and protect it from the high temperature environment of the furnace.

Figure 2:
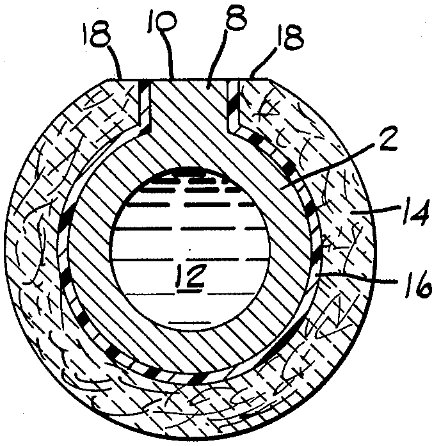
FIG. 2 is a cross-sectional view of one skid pipe taken on plane 2—2 of FIG. 1.

In the invention herein the skid pipe 2 is essentially surrounded by a mass or batt of unbonded, unreinforced refractory fiber 14 which is adhered to the outer surface of skid pipe 2 by a suitable adhesive 16. The thickness of the batt of fibrous insulation will be approximately equal to or less than the height of the skid rail 8 as shown in FIG. 2. The batt must not project above the level of the top surface 10 of skid rail 8 because it would then interfere with the passage of the slabs and billets. Where the batt 14 is slightly thicker than the height of the projection 8, the top portion may be trimmed level with surface 10 as shown at 18. Since the normal height of such projections is approximately 1 inch (2.5 cm), the fibrous batt would therefore normally have a thickness of approximately 1 inch (2.5 cm). However, thicknesses ranging from about ½ inch (1.3 cm) up to 2 inches (5.1 cm), with the thicker materials suitably trimmed, are satisfactory, although the range of ¾ inch (1.9 cm) to 1½ inches (3.8 cm) in thickness is preferred. The exact amount of thickness to be used will be dependent upon obtaining the best thermal resistance consistent with the cost and labor involved in purchasing and installing the insulation (the concept of "economic thickness"). Normally approximately 1 inch (2.5 cm) is adequate, for the addition of substantially more insulation does not proportionately reduce the transmission of heat. in addition, the use of thicknesses of approximately ¾ inch (1.9 cm) to 1½ inches (3.8 cm) minimizes the amount of labor in trimming the insulation. In addition, it also minimizes the projected surface area of the insulation upon which mill scale can fall. Thinner insulations are considerably less susceptible to tearing or other damage from the falling mill scale.

Figure 3:
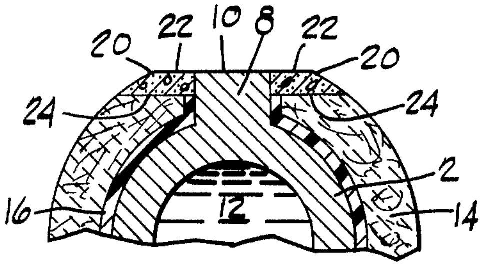
FIG. 3 is a partial cross-sectional view similar to that of FIG. 2 and illustrates a preferred embodiment of the insulation of this invention.

In order to minimize the damaging effects of mill scale, it is preferred to put a layer of refractory cement 20 on top of the fiber batt 14, as shown in FIG. 3. This will also be trimmed level with the top surface 10 of skid rail 8, as shown at 22. The top 24 of batt 14 will of course be slightly lower to allow room for the cement layer 20.

The refractory fiber useful in the insulation of the present invention is composed of those inorganic fibers which are capable of sustaining temperatures in excess of 2000° F (1100° C) for prolonged periods of time. These are normally aluminosilicate fibers (which may contain additional metal oxides) as well as other oxide fibers such as fibers wholly or predominately of alumina. Preferred are those aluminosilicate fibers formed from melts of relatively equal amounts of alumina and silica, with up to approximately 10% additional oxides such as zirconia, chromia, titania, and the like. Typical fibers are those described in the section entitled "Refractory Fibers" in the *Encyclopedia of Chemical Technology,* vol. 17 (2nd ed., 1968). Such fibers are commercially available from Johns-Manville Corporation under the trademarks CERAFIBER and FIBERCHROME. Typical working temperatures are 2300° F (1260° C) for the substantially pure aluminosilicate fibers, and 2700° F (1480° C) for aluminosilicate fibers with added chromia, such as those described in U.S. Pat. No. 3,449,137. Such fibers are available in both bulk form (which may be formed into batts by the user), or in preformed batts, under the trademarks CERABLANKET and FIBERCHROME BLANKET.

The adhesive 16 may be any suitable inorganic adhesive which will withstand the temperatures to be encountered. A typical material is soidum silicate, which may be reinforced with asbestos fibers or ceramic fibers or which may be used without reinforcement. Other inorganic high temperature adhesives are also satisfactory.

The method of applying the fibrous insulation is uncomplicated. The workman merely coats a section of the outer surface of the skid pipe with the adhesive, being sure to cover the entire circumference except for the top of the skid rail projection (as shown in FIGS. 2 and 3). The batt of refractory fiber is then wrapped around the rail and held in place by being tied with an overwrap of string, light wire or similar binding material. The workman should at this point be concerned primarily with making sure that the batt contacts the adhesive at all points. Overlap above the top of the rail projection at this time is not important, for any such overlap will be subsequently trimmed with a knife, scissors or other cutting tool. The string or other binding material is drawn sufficiently tight to pull the batt into firm contact with the adhesive. It should not be so tight, however, as to crush or break the fibers. There will be a certain degree of compression of the fiber batt, of course, but that can be readily tolerated due to the resilience of the batt. After the adhesive has set and the batt is firmly bound to the skid pipe, the binding material is removed and the top surface of the batt is trimmed if necessary to align with the top surface 10 of skid rail 8.

A similar procedure is used in the embodiment of FIG. 3, except that the adhesive need not come to the top of the skid rail 8, and the fiber batt 14 is trimmed lower to leave room for the cement layer 20. After the fiber batt 14 is firmly adhered to the skid pipe 2, the cement layer 20 is applied as by troweling and leveled even with the top surface 10 of skid rail 8 as shown at 22.

The fiber batts of the present invention have very low density, normally being in the range of 3 to 24 lbs/ft$^3$ (0.048 to 0.38 g/cm$^3$), preferably 3 to 10 lbs/ft$^3$ (0.048 to 0.160 g/cm$^3$. Because of the resultant light weight of the batts, batts of 6 to 10 feet (1.8 to 3 m) can be readily handled and applied to the pipes. Thus, the workman can insulate long sections of skid pipe very rapidly. This is in direct contrast to the practices of the prior art (such as that shown in the aforesaid U.S. Pat. No. 3,848,034) where the high density and great weight of reinforced refractory cements mean that only very short segments, often only 1 foot (30 cm), can be insulated at one time.

In addition, the insulation of this invention is readily applied as described above, by simply tying it in place until the adhesive sets. This also is in direct contrast with the prior art, where elaborate anchoring means, forms for the cement, supports for the forms, and other paraphernalia are required (also as illustrated in the aforesaid U.S. Pat. No. 3,848,034).

As an example of the invention herein, 4 foot (1.2 m) lengths of skid pipes in a commercial steel mill reheat furnace were insulated with batts of aluminosilicate fiber commercially available under the trademark CERABLANKET from Johns-Manville Corporation. These batts were of 1 inch (2.5 cm) thickness and had a density of 8 lb/ft$^3$ (0.13 g/cm$^3$). The batts were adhered to the skid pipes by a commercial sodium silicate based adhesive also available from the Johns-Manville Corporation. The batts were restrained for 24 hours by tying with cord while the adhesive set. Thereafter the cord was removed and subsequently the furnace returned to service. The insulation proved to have a service life of several months.

What I claim is:

1. The method of insulating a steel mill reheat furnace skid pipe which comprises adhering to said skid pipe an unbonded, unreinforced batt of refractory fiber, said batt being disposed in adhered position so that no significant portion thereof extends above the level of the top of the rail projection of said skid pipe.

2. The method of claim 1 wherein said batt of refractory fiber is adhered to said skid pipe by a layer of adhesive applied to the outer surface of said skid pipe.

3. the method of claim 2 wherein said adhesive is an inorganic material.

4. The method of claim 1 wherein said batt of refractory fiber has a thickness measured radially of said skid pipe on the order of ½ to 2 inches.

5. The method of claim 4 wherein the thickness of said batt of insulation is on the order of ¾ to 1½ inch.

6. The method of claim 1 wherein said refractory fiber comprises fiber of predominately aluminosilicate composition.

7. The method of claim 6 wherein said aluminosilicate fiber is formed from a melt of approximately equal amounts of alumina and silica.

8. The method of claim 7 wherein said aluminosilicate fiber also contains up to approximately 10% of at least one additional refractory metal oxide.

9. The method of claim 1 wherein said batt of refractory fiber has a density in the range of from 3 to 24 lbs/ft$^3$.

10. The method of claim 9 wherein said batt of refractory fiber has a density in the range of 3 to 10 lbs/ft$^3$.

11. The method of claim 1 further comprises applying to the top of said batt a layer of refractory cement.

12. An insulating structure for a steel mill reheat furnace skid pipe formed according to the method of claim 1.

13. An insulating structure for a steel mill reheat furnace skid pipe formed according to the method of claim 11.

* * * * *